March 6, 1962 H. A. R. DE MIRANDA ET AL 3,024,367

BISTABLE CIRCUIT ARRANGEMENT

Filed March 5, 1958

INVENTOR
HEINE ANDRIES RODRIGUES DE MIRANDA
THEODORUS JOANNES TULP

BY Frank R. Jifari
AGENT

United States Patent Office 3,024,367

Patented Mar. 6, 1962

3,024,367

BISTABLE CIRCUIT ARRANGEMENT

Heine Andries Rodrigues de Miranda and Theodorus Joannes Tulp, Eindhoven, Netherlands, assignors to North American Philips Company, Inc., New York, N.Y., a corporation of Delaware Filed Mar. 5, 1958, Ser. No. 719,402
Claims priority, application Netherlands Mar. 22, 1957
12 Claims. (Cl. 307—88)

The invention relates to a device comprising a bistable trigger circuit and an impedance which exhibits a high or a low value in accordance with the condition of the trigger circuit.

From "Proceedings of the Institution of Electrical Engineers," part B, suppl. 1 to 3 of September-November 1956, circuit arrangements are known in which each pulse of a sequence of input pulses of the same polarity, changes the magnetic condition of a ferromagnetic memory storage core and hence also the impedance with respect to the pulses of a winding provided on the core; the impedance is changed alternately between two given conditions and with the aid of one or more transistors.

In Belgian patent specification No. 544,125 is described a transistor trigger circuit comprising two transistors and a voltage-dependent impedance, the latter being included in the collector circuit of one of these transistors and allowing the arrangement to be brought into any of a plurality of stable conditions.

There is furthermore described in "Electrical Engineering" of October 1952, pages 816–922, a so-called ferroelectrical memory, the operation of which is based on the variations in the impedance of a capacitor with the polarization condition of its dielectric, provided this dielectric, for example barium-titanate, has a substantial amount of hysteresis.

These arrangements may be employed particularly in computers, automatic telephone exchanges and similar apparatus, for example as counters.

The invention relates to a particularly simple device which is composed of only few parts and which comprises a bistable trigger circuit and a variable impedance controlled thereby between two alternate conditions. The conductive or non-conductive condition of a transistor and the value of the impedance are, in this case, changed by each pulse of a sequence of control pulses, whereas they remain unchanged in the interval between two successive control-pulses, so that, so to say, a double memory is available.

The device according to the invention has the feature that the input circuit of the trigger circuit is connected to two diagonal points of an impedance bridge, of which the two further diagonal points are connected to a source of control-pulses and that a branch of this impedance bridge includes the said variable impedance, so that control-pulses of the same polarity produce pulses of alternate polarities at the input terminal of the trigger circuit and switch the arrangement alternately on and off.

The invention will be described more fully with reference to the drawing, in which.

Figure 1:
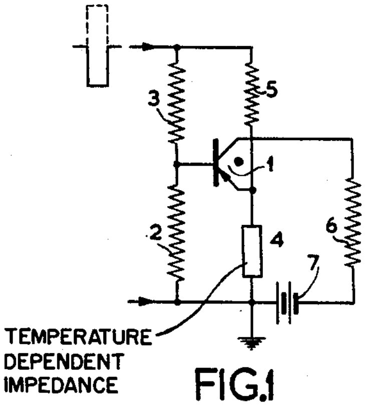
FIG. 1 shows the principal diagram of a particularly simple embodiment of a device according to the invention.

The first embodiment shown in FIG. 1 comprises a point-contact transistor 1, or any transistor having an emitter-collector current amplification factor higher than 1. The collector-emitter circuit of this transistor includes a load resistor 6, a voltage supply 7 and a variable impedance 4, which are connected in series with one another in the order indicated. Through a resistor 2 the base electrode of the transistor 1 is connected to earth and to the junction of the voltage supply 7 and the impedance 4. The said base electrode is, moreover, connected through two series-connected resistors 3 and 5 to the emitter electrode.

As long as the emitter-collector circuit of the transistor 1 is not traversed by current, no forward bias voltage occurs at the base electrode, so that the transistor 1 is stable in this non-conducting condition. However, if a current passes through the emitter-collector circuit, a current will pass through the resistor 2 to the base electrode, so that this electrode is biased in the forward direction approximately in accordance with the voltage drop across the resistor 2 in addition to that across the impedance 4, since the emitter-collector current amplification factor of the transistor 1 exceeds 1 and the base current therefore flows in the said direction. The current passing through the emitter-collector circuit is then restricted practically only by the resistor 6 and the resistance of the impedance 4. Consequently, the transistor arrangement is also stable in the second condition, wherein a comparatively high current traverses the emitter-collector circuit of the transistor 1.

The resistors 2, 3 and 5 and the impedance 4 constitute an impedance bridge and the input terminals of the device are connected to two diagonal points formed by the junction of the resistor 2 and the impedance 4 and the junction of the resistors 3 and 5. The base emitter circuit of the transistor 1 is connected to the other diagonal points of the impedance bridge.

The variable impedance 4 may, for example, be a resistor, the value of which increases strongly with the current traversing it owing to a high positive temperature coefficient. If the bistable trigger circuit with the transistor 1 is in the non-conducting condition, the resistance of the impedance 4 is comparatively low. If a negative pulse is then applied to the input terminals of the device, the base electrode of the transistor 1 becomes more negative than the emitter electrode, since the ratio between the resistance of the impedance 4 and the resistor 5 is smaller than that between the resistor 2 and the resistor 3. Consequently, the negative pulse produces a base current, so that a considerably higher current passes through the emitter-collector circuit of the transistor and the trigger circuit is brought from its non-conducting condition into its conductive condition. The emitter current of the transistor 1 passes through the impedance 4, so that its resistance increases strongly. Thus the ratio between the resistors 4 and 5 changes so that the next-following negative pulse applied to the junction of the resistors 3 and 5 renders the emitter electrode of the transistor 1 more negative than the base electrode in contradistinction to the action of the first pulse. Consequently, this next-following pulse will bring the trigger circuit from the conductive-condition back into the non-conductive condition. In other terms, control-pulses of the same polarity produce pulses of alternating polarity in the input circuit between the base electrode and the emitter electrode of the trigger circuit and switch this circuit alternately on and off.

As an alternative, the impedance 4 could be formed by a resistor having a high negative temperature coefficient, in which case positive pulses would be applied to the juncture of the resistors 3 and 5 in order to ensure a similar control of the arrangement. With the variant shown in FIG. 2 the trigger circuit with its transistor 1 is replaced by a bistable trigger circuit having two junction transistors 1' and 11', having an emitter-collector current amplification factor of less than 1. The base-emitter circuit of the transistor 1' is connected in the same manner as that of the transistor 1 of the embodiment shown in FIG. 1 to two diagonal points of the impedance bridge 2, 3, 4 and 5 and the emitter-collector circuit also includes the load resistor 6, the voltage supply 7, and the variable impedance 4. However, since the base current does not flow in a direction to produce a regenerative feed-back across the resistor, such a feed-back must be obtained in a different way. Therefore, the collector electrode of the transistor 1' is connected to the base electrode of the transistor 11' via a resistor 19, which is shunted by a capacitor 20. The emitter electrode of the latter transistor is connected to earth and the collector is connected via a load resistor 16 to the negative terminal of the voltage supply 7, and, via a resistor 9 shunted by a capacitor 10, to the base electrode of the transistor 1'. The trigger circuit comprises, moreover, a resistor 12, through which the base electrode of the transistor 11' is connected to earth.

If, for example, the transistor 1' is non-conductive, the base electrode of the transistor 11' is biased in the forward direction via the resistor 19, so that the transistor 11' is conductive. Consequently, a fairly high current passes through the corresponding load resistor 16, so that the base electrode of the transistor 1' is substantially at earth potential via the resistor 9, this transistor thus remaining non-conductive or blocked.

Figure 2:
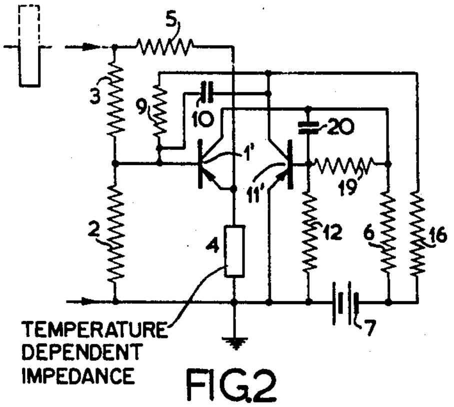
FIG. 2 shows a variant of the embodiment shown in FIG. 1.

The variant shown in FIG. 2 is controlled in the same manner as the embodiment shown in FIG. 1 by negative pulses applied to the junction of the resistors 3 and 5, if the variable impedance 4 has a positive temperature coefficient, and by positive pulses (indicated in broken lines), if the variable impedance 4 has a high negative temperature coefficient.

The embodiment shown in FIG. 1 and the variant shown in FIG. 2 are comparatively slow devices. They can operate satisfactorily only if the interval between successive pulses exceeds a time interval corresponding to the thermal inertia of the variable impedance. For a resistor having a high negative temperature coefficient, this time interval may be of the order of a few seconds. Moreover, the control-pulses must be comparatively short, since otherwise the end of a control-pulse could drive the device again in the other direction.

Figure 3:
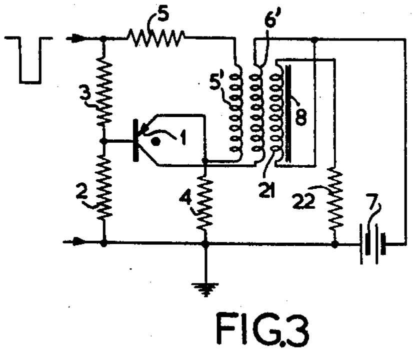
FIG. 3 shows the diagram of a particularly suitable embodiment.

FIG. 3 shows a second embodiment, which is capable of acting very rapidly and yet which possesses the desirable properties of FIGURES 1 and 2. This embodiment comprises again a transistor 1, having an emitter-collector current amplification factor greater than 1, this transistor being included in a bistable trigger circuit. The collector-emitter circuit includes a load resistor constituted by winding 6', arranged on a core 8 of a magnetic material having a high permeability, for example, on a small annular core of ferroxcube or of a different ferrite, a voltage supply 7 and a resistor 4 associated with an impedance bridge 2, 3, 4 and 5. The emitter-base circuit is connected to two diagonal points of this impedance bridge, of which one of the branches includes a second winding 5', arranged on the core 8 and connected in series with the resistor 5. The magnetic core has, furthermore, a third winding 21, which is connected in series with a resistor 22 to the voltage supply 7.

Figure 5:
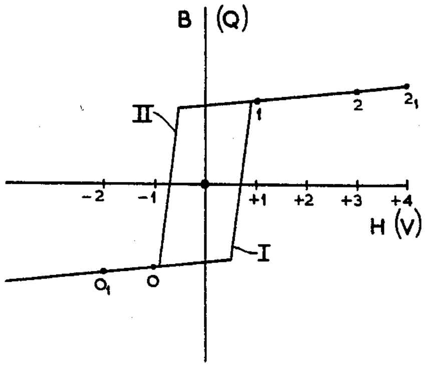
FIG. 5 shows a diagram to explain the operation of the devices shown in FIGS. 3 and 4.

FIG. 5 shows diagrammatically the hysteresis loop of the material of the core 8. The current passing through the winding 21 biases the core, so that its condition with a non-conductive transistor 1 may be represented by point 0 on the left-hand side at the bottom of the BH-diagram. A negative pulse applied to the junction of the resistors 3 and 5 produces a current through the winding 5', which current causes the core 8 to change over, so that its condition is represented by point 1 (on the right-hand side at the top of FIG. 5). Thus the magnetization condition of the core changes along the curve I from a negative into a positive saturation condition. The curve I has a steep portion, so that the impedance of the winding 5' is comparatively great with respect to the negative input pulse and the base electrode of the transistor 1 becomes more negative than the emitter electrode. Consequently, the trigger circuit with the transistor 1 is brought into its other condition, in which the transistor is conductive. The collector current of the transistor 1 traverses the winding 6', so that the core is driven further into its positive saturation condition (point 2, on the right-hand side at the top of FIG. 5). At the end of the control-pulse the transistor 1 remains conductive, since it is fed back by means of the resistors 2 and 3 connected in the base-emitter circuit, so that the core remains in the positive saturation condition. The magnetic field across the core decreases, it is true, but it remains positive, since the number of ampere turns produced across the winding 6' by the collector current exceeds the number of ampere turns in the reverse direction produced by the current traversing the winding 21. The magnetic condition of the core is then again represented by point 1.

A second negative pulse applied to the junction of the resistors 3 and 5 moves the core 8 further into the positive condition of saturation towards point 2. The core remains saturated, so that the winding 5' of this core has a comparatively small impedance. Consequently, the emitter electrode of the transistor 1 becomes more negative than the base electrode and this transistor is again blocked. The magnetic saturation of the core then decreases strongly to point 1 and after the end of the control-pulse the core changes over to point 0 along the curve II, so that the complete device is again in the initial condition.

With the description of the operation of the device shown in FIG. 3 it has been assumed that the number of ampere turns produced by the control-pulse across the winding 5' and the number of ampere turns produced by the collector current traversing the winding 6' are equal and are each twice the number of ampere turns produced by the biasing current traversing the winding 21. These are optimum operational conditions, which, however, are not indispensable for a satisfactory operation. It suffices to this end for the respective number of ampere turns in the windings 5' and 6' to exceed the number of biasing ampere turns by the number of ampere turns corresponding to the saturation of the core. FIG. 5 shows, by way of example, an initial condition of stronger negative saturation $0_1$. The number of ampere turns in the winding 5' owing to the control-pulse must, in this case, be sufficiently high to cause the core to change over to the positive condition of saturation (point 1). The number of ampere turns in the winding 6' must, in this case, saturate the core at least to an extent such that its condition can be represented by point $2_1$, so that after the end of the control-pulse it returns to point 1. The core constitutes a permanent memory. If, for example, the supply source 7 is switched off, it remains magnetized in one direction or the other, according to the one or other condition of saturation in which it was. This magnetic memory may be read at any desired instant, for example with the aid of an auxiliary winding. Irrespective thereof, the device constitutes a memory capable of retaining an information in the form of the conductive or non-conductive condition of the transistor 1.

Figure 4:
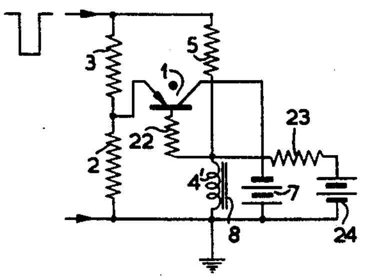
FIG. 4 shows a variant of the embodiment shown in FIG. 3.

FIG. 4 shows a variant of the embodiment shown in FIG. 3. With this variant the windings 5', 6' and 21' are replaced by a single winding 4', arranged on the core 8. This winding constitutes a branch of the impedance bridge, which comprises the resistors 2, 3 and 5 and it is included in the base circuit of the transistor 1. The emitter of this transistor is connected to the junction of the resistors 2 and 3 and the collector is connected to the negative terminal of the voltage supply 7, the other terminal of which is connected to earth. The base circuit of the transistor 1 includes, moreover, a feed-back resistor 22, so that the transistor arrangement constitutes a bistable trigger circuit. A second voltage supply 24 in series with a resistor 23 is connected across the impedance 4', the negative terminal of this supply being connected to earth, so that the current traversing the resistor 23 and the winding 4' magnetizes the core 8 in the reverse direction with respect to the base current of the transistor 1 and to the current produced by a negative pulse applied to the junction of the resistors 3 and 5. This variant operates in the same manner as the embodiment shown in FIG. 3, the difference being, however, that not the collector current of the transistor 1 but the base current thereof traverses a winding arranged on the core 8. The base current of a transistor having an emitter-collector current amplification factor exceeding 1, is, however, of the same order as the collector current, so that this difference implies, at the most, the requirement of a comparatively small increase in the number of turns of the winding 4'. The desired relative ratios between the bias current, the base current and the pulse current across the winding 4' may be adjusted by means of the resistors 23, 22 and 5.

Figure 6:
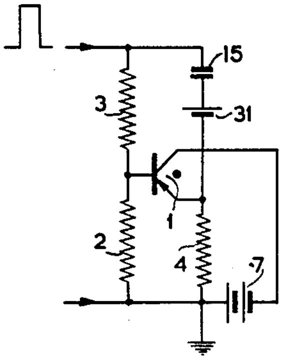
FIG. 6 shows diagrammatically a third embodiment.

The third embodiment shown in FIG. 6 resembles the variant shown in FIG. 4. The winding 4' is replaced, however, by a common resistor 4, whilst the resistor 5 is replaced by a capacitor 15, having a dielectric of ferro-electric material, for example barium-titanate. This kind of material exhibits an electric hysteresis loop of a shape which is comparable with that of the magnetic hysteresis loop of a ferromagnetic material, for example a ferrite. It may be assumed, for example, that the BH-curves of FIG. 5 can represent also QV-curves of the ferro-electric material employed.

A polarization-voltage source 31 is connected in series with the capacitor 15, so that the ferro-electric material is practically saturated by a polarization field produced by the said source; its condition may be represented, for example by point 0 of the QV-curve of FIG. 5. If a positive pulse is applied to the junction of the resistor 3 and of the capacitor 15, the polarization of the dielectric of the capacitor is reversed along the curve I of FIG. 5, so that a great charge difference is set free. The capacitor thus exhibits a comparatively low impedance with respect to the control-pulse and the emitter electrode of the transistor 1 becomes more positive than the base electrode. The transistor 1 thus becomes conductive and the voltage across the capacitor is increased by the voltage-drop across the resistor 4, which voltage-drop is substantially equal to the voltage of the source 7. The dielectric of the capacitor 15 is thus further polarized, so that the working point on the QV-curve shifts for example from point 1 to point 2. After the end of the control-pulse the working point returns to point 1.

The next-following, positive control-pulse drives the dielectric of the capacitor 15 only further into the positive saturation region, for example to point 2 of the QV-curve. The charge difference thus occurring is only small and the capacitor thus behaves as a capacitor of comparatively low capacity. The positive control-voltage applied to the base electrode of the transistor 1 is therefore higher than that applied to the emitter electrode via the capacitor 15 and the transistor 1 is blocked, so that the working point of the dielectric of the capacitor 15 returns to point 1 of the QV-curve. After the end of the control-pulse the polarization of the dielectric of the capacitor 15 is reversed the working point shifting along the curve II of FIG. 5 from point 1 back to point 0.

If the transistor 1 is conductive, the potential of the base electrode is substantially equal to that of the emitter electrode and of the collector electrode. This potential is applied, via the resistor 3, also to the upper electrode of the capacitor 15' and counteracts the voltage of the control-pulse and that across the resistor 4. In order to restrict this counter-action a control-pulse source may be used having a direct-current resistance which is much smaller than the value of the resistor 3, or a comparatively high resistance may be included between the base electrode of the transistor 1 and the junction of the resistors 2 and 3.

The embodiments and the variants described with reference to FIGS. 1 and 2 are very slow devices and can therefore be used only with comparatively slow-action control-, supervision- or governing systems, for example for the control of a thermal process. The variable impedance 4 could, for example, be constituted by a Philips NTC-resistor of the type 83,900. With an ambient temperature of 20° C. this resistor is cooled within 4 seconds to a degree such that its value increases from about 80 ohms to about 800 ohms. In order to heat the resistor 4 rapidly, it will be fed with a maximum permissible current by means of a source 7 of comparatively high voltage, for example of 30 v., via a current-limiting resistor 6 of, for example, 1500 ohms. Under these conditions the device can operate with a pulse interval of the order of 4 seconds.

The working speed of a device as shown in FIG. 3 or 4 will be restricted, under certain conditions, by the limit frequency of the amplification factor of the transistor employed. It is known, indeed, that magnetic memory cores of ferroxcube may be controlled by pulses having a width of the order of 0.1 μsec. The permeability of such cores changes very strongly along the hysteresis loop, for example between about 1 in the saturation range and about 5000 along the steep part of the curve I or II of FIG. 5. The mean permeability with respect to a current pulse across one of the windings of the core 8 is, however, much lower. It corresponds approximately to the steepness of a straight line joining the points 0 and 1 of FIG. 5, whereby it must be taken into consideration that the hysteresis loop is flatter at higher frequencies. With comparatively slow, wide pulses an impedance variation of the order of 1000 to 1 and with very short pulses a variation of the order of 100 to 1 may be expected.

Finally, the maximum operational speed of a device as shown in FIG. 6, comprising the available ferro-electric material, is of the same order as that of a device comprising a memory core as shown in FIG. 3 or 4. The polarization of capacitors having a ferro-electric dielectric on the basis of barium titanate has been reversed by means of pulses having a width of 0.75 μsec. The variation of the effective impedance with respect to the pulse was of the order of 4 to 1 only. With pulses of a width of 5 msec. this variation increased to about 15 to 1, whilst the ratio between the maximum dielectric constant (along the steep portion of the curve I or II of FIG. 5) and the dielectric constant in the saturated condition was slightly smaller than 100:1. The ferro-electric dielectrics are, however, comparatively new and it may be assumed that materials will be found which are better suitable for use in a device according to the present invention than the materials hitherto known.

What is claimed is:

1. A device comprising a bistable trigger circuit and a variable impedance controlled by said circuit between two alternate conditions, said bistable trigger having an input circuit connected to one set of diagonal points of an impedance bridge, another set of diagonal points of said bridge being coupled to a source providing a series of control pulses of like polarity, one branch of said impedance bridge including said variable impedance, said series of control pulses operating to switch said circuit alternately on and off and to change said impedance in synchronism therewith alternately from a relatively high to a relatively low value.

2. A device as claimed in claim 1, said trigger circuit comprising a transistor, and said variable impedance being constituted by a winding arranged on a core of ferromagnetic material having a substantially rectangular hysteresis loop magnetically polarized to saturation, said winding being included in a current circuit of said transistor.

3. A device as claimed in claim 2, characterized in that the said impedance bridge and the current circuit of the said transistor are so proportioned and the said core is polarized in a direction such that the components of the magnetic field in the core produced by a control-pulse and by the current traversing the said current circuit when the transistor is conductive are opposed to the polarization field, which they exceed at least by a value equal to the saturation field intensity.

4. A device as claimed in claim 2, characterized in that the said core is provided with a winding traversed by a direct current which magnetically polarizes the core.

5. A device as claimed in claim 1, wherein said variable impedance includes a material exhibiting a hysteresis loop, said trigger circuit comprising a transistor, and said variable impedance being constituted by a capacitor having a dielectric composed at least in part of a ferro-electric material electrically polarized to saturation, a direct voltage being applied to said impedance bridge through the collector circuit of said transistor, whereby the electrical saturation condition of the ferro-electric material and the value of the variable impedance vary in accordance with the condition of the trigger circuit.

6. A device as claimed in claim 5, characterized in that the said impedance bridge and a supply voltage source for the said transistor are so proportioned and the said ferro-electric material is polarized in a direction such that the components of the electric field in the said ferro-electric material produced by a control-pulse and by the voltage applied to the impedance bridge when the transistor is conductive are opposed to the polarization field, which they exceed by at least a value equal to the saturation field intensity.

7. A device as claimed in claim 5, characterized in that the said capacitor is connected in series with a source of substantially constant voltage of a polarity to polarize the said ferro-electric material to saturation.

8. A device as claimed in claim 1, characterized in that the said trigger circuit includes a single transistor, of which the emitter-collector current amplification factor has a value greater than 1 and of which the collector-base circuit is coupled to the emitter-base circuit by means of a feed-back resistor, so that the transistor can alternately assume two stable conditions.

9. A device as claimed in claim 8, characterized in that the said feed-back resistor is included in the said impedance bridge.

10. A device as claimed in claim 8, characterized in that the trigger circuit includes an output circuit connected to one of the diagonal points of the said impedance bridge coupled with the pulse source.

11. A device as claimed in claim 8, characterized in that the said one set of diagonal points of the impedance bridge are connected to the base electrode and the emitter electrode of the said transistor respectively.

12. A device including a bistable trigger and a nonlinear element having a variable impedance adapted to be switched by the trigger between two alternate conditions, said trigger having an input circuit connected to two diagonally opposed junction points of an impedance bridge, the other diagonally opposed junction points of the bridge being coupled to a source of control pulses of like polarity, one arm of said bridge including said nonlinear element, means for applying to said element a bias having a condition depending on the condition of the trigger, said trigger-dependent bias permitting the control pulses of like polarity to produce pulses of alternate polarity in the input circuit of the trigger and to alternately switch the trigger on and off, said element including a material having a substantially rectangular hysteresis loop and opposite saturation conditions corresponding to said bias conditions, the voltage produced across said element by the trigger circuit under the control of a control pulse having a polarity opposite to that of the bias corresponding to the condition of the trigger at the occurrence of said control pulse and exceeding said bias in amplitude by an amount sufficient for changing the condition of the material of said element from either of its saturation conditions to the opposite saturation condition.

References Cited in the file of this patent

UNITED STATES PATENTS

| | | |
|---|---|---|
| 2,614,140 | Kreer | Oct. 14, 1952 |
| 2,714,702 | Shockley | Aug. 2, 1955 |
| 2,724,061 | Emery | Nov. 15, 1955 |
| 2,755,446 | Gabor | July 17, 1956 |
| 2,772,370 | Bruce et al. | Nov. 27, 1956 |
| 2,776,372 | Ensink et al. | Jan. 1, 1957 |
| 2,838,669 | Horsch | June 10, 1958 |